(12) United States Patent
Gunadisastra et al.

(10) Patent No.: US 8,370,959 B2
(45) Date of Patent: Feb. 5, 2013

(54) CONNECTION DEVICE AUTHENTICATION

(75) Inventors: Peter Gunadisastra, Palo Alto, CA (US); Bradley D. Erickson, Los Altos, CA (US); Rick K. Yoshida, Sunnyvale, CA (US)

(73) Assignee: Cisco Technology, Inc., Santa Clara, CA (US)

( * ) Notice: Subject to any disclaimer, the term of this patent is extended or adjusted under 35 U.S.C. 154(b) by 437 days.

(21) Appl. No.: 12/508,370

(22) Filed: Jul. 23, 2009

(65) Prior Publication Data
US 2011/0023111 A1 Jan. 27, 2011

(51) Int. Cl.
*G06F 21/00* (2006.01)
(52) U.S. Cl. .......................... 726/34; 713/320
(58) Field of Classification Search .............. 726/16, 726/17, 2, 34; 713/192, 170, 300, 320
See application file for complete search history.

(56) References Cited

U.S. PATENT DOCUMENTS

| | | | |
|---|---|---|---|
| 2007/0049058 A1* | 3/2007 | Kobayashi | 439/13 |
| 2007/0237472 A1* | 10/2007 | Aronson et al. | 385/101 |
| 2008/0166131 A1* | 7/2008 | Hudgins et al. | 398/117 |

FOREIGN PATENT DOCUMENTS

| | | |
|---|---|---|
| EP | 2034423 A2 | 3/2009 |
| GB | 2181582 | 4/1987 |
| WO | WO-2006073702 A1 | 7/2006 |
| WO | WO-2011011696 A1 | 1/2011 |

OTHER PUBLICATIONS

International Application Serial No. PCT/US2010/043070, Search Report mailed Oct. 20, 2010, 7 pgs.
International Application Serial No. PCT/US2010/043070, Written Opinion mailed Oct. 20, 2010, 6 pgs.
International Application Serial No. PCT/US2010/043070, International Preliminary Report on Patentability Mailed Feb. 2, 2012, 7 pgs.

* cited by examiner

*Primary Examiner* — Edward Zee
(74) *Attorney, Agent, or Firm* — Schwegman, Lundberg & Woessner, P.A.

(57) ABSTRACT

A method and apparatus are provided for a secure interconnect between data modules, including a security apparatus within a secured data connection device installed with a security chip. The connection device may be authenticated prior to enabling a stacking feature. Authentication of a connection device may be used to ensure the quality and performance of the connection device and the data modules.

20 Claims, 8 Drawing Sheets

CONNECTION DEVICE AUTHENTICATION

TECHNICAL FIELD

The present disclosure relates generally to data connection devices for electronic devices. In an example embodiment, the disclosure relates to authentication of data connection devices for stacking electronic devices, such as data processing modules.

BACKGROUND

Electronic devices, such as servers, routers and other data processing modules are often joined together in a stack configuration to create a composite unit. Stacking configurations may join multiple electronic devices to create a single operational unit using an interconnect apparatus, such as a connection device. The performance of the interconnect apparatus directly impacts performance of the individual electronic devices.

BRIEF DESCRIPTION OF THE DRAWINGS

Some embodiments are illustrated by way of example and not limitation in the figures of the accompanying drawings in which.

DESCRIPTION OF EXAMPLE EMBODIMENTS

Figure 1:
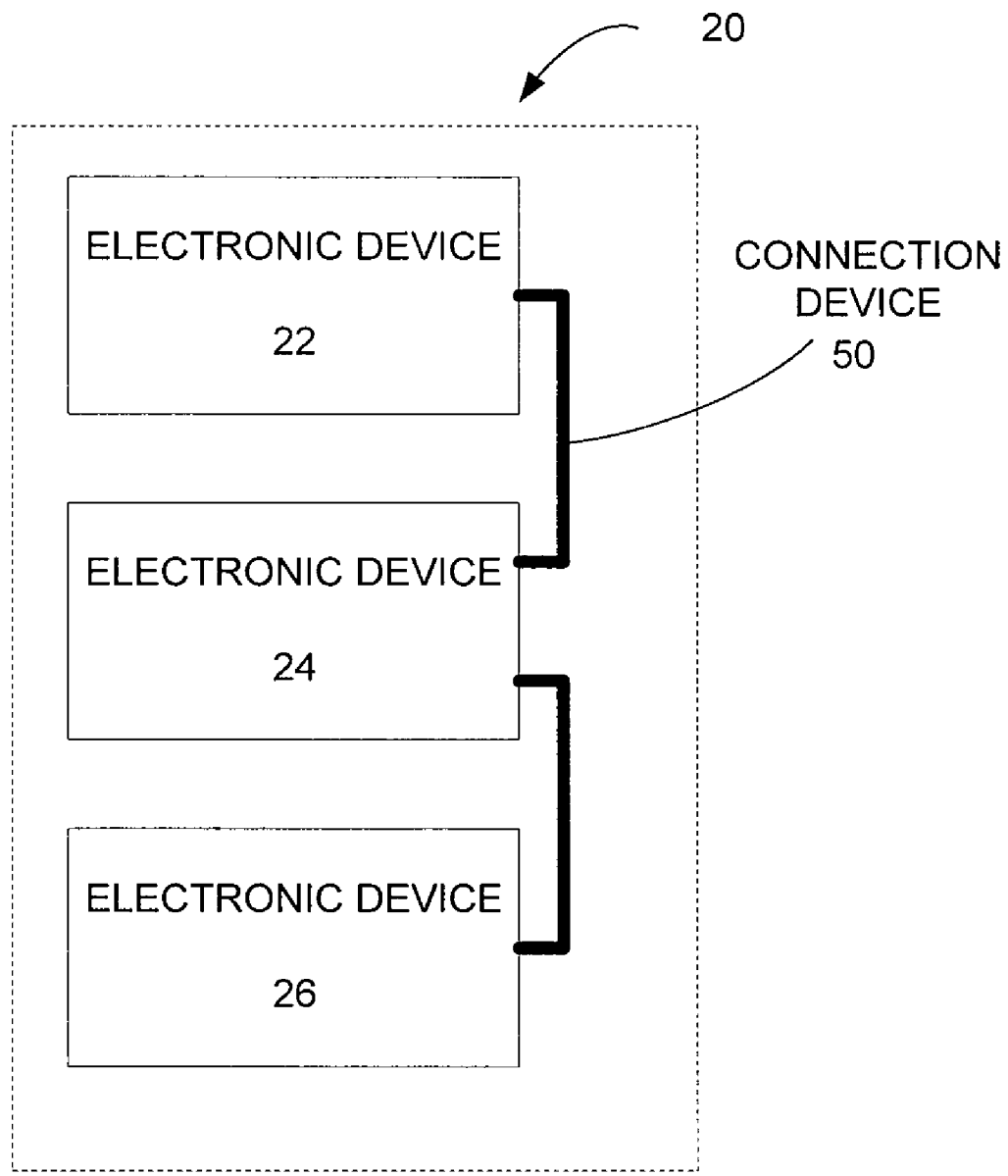
FIG. 1 is a block diagram illustrating a stack configuration of electronic devices, according to example embodiments.

In the following description, for purposes of explanation, numerous specific details are set forth in order to provide a thorough understanding of an example embodiment of the present disclosure. It will be evident, however, to one skilled in the art that the present disclosure may be practiced without these specific details. While examples are illustrated for clarity of understanding, the figures are not drawn to scale, but rather include blocks, circuitry, method elements and decision points which are drawn to illustrate functionality, configuration or connectivity of the various embodiments.

Overview

A method and apparatus for an interconnect apparatus between electronic devices, including an authentication module within a connection device, are disclosed. The connection device may be authenticated prior to enabling a stacking feature. Authentication may be used to ensure that the connection device is of sufficient quality to provide adequate performance when connecting the data modules.

A connection device for providing information to an electronic device is further disclosed, wherein the connection device provides information to the electronic device on connection. The connection device includes a processing unit which may include authentication, security or other information specific to the connection device. The processing unit in one example is powered by the electronic device, such as by a dedicated power connection.

In one embodiment, a connection device includes a cable with connectors provided at each end of the cable. The connection device provides communication among electronic devices coupled to the connectors. The connection device includes at least one processing module to facilitate authentication of the connection device for use with at least one electronic device. In some embodiments, the connection device has an authentication module in each of the connectors, at each end of the cable. In some embodiments, the authentication module may be positioned at an end of the cable, at each end of the cable, or within the cable.

In another aspect, a network device includes circuitry to process network communications as well as at least one connection port to interconnect the network device to another network device via a connection device. The network device includes a connection device authentication module, the connection device authentication module being configured to receive authentication information from circuitry in the connection device and, to authenticate the connection device based on the authentication information.

The connection device authentication module may be implemented as software, firmware, circuitry, or a combination. The connection device authentication module interacts with an authentication module in the connection device to receive authentication information and evaluate the authentication information to authenticate the connection device. When the connection device is authenticated, the network device enables the connection device for transmissions, such as data communications, with other electronic devices, such as in a data processing stack.

Example Embodiments

FIG. 1 is a block diagram illustrating stack configuration 20, according to an example embodiment. The stack 20 includes electronic devices 22, 24 and 26, which may include server modules, switching modules, router modules, and so forth, or a combination thereof. As illustrated, the electronic devices 22, 24 and 26 are coupled together using a connection device 50, in accordance with an example embodiment. The connection device 50 enables communications among the electronic devices 22, 24 and 26, as well as communications external to the stack 20. Although various embodiments are described by way of example with reference to electronic devices 22, 24 and 26 used in a stack configuration, it should be noted that the example connection devices and methodologies described herein may apply to other connection device connectors interconnecting various types of electronic devices.

The ability to connect multiple electronic devices in a physical and communicative configuration is generally referred to as "stacking" Stacking technology provides a way to collectively utilize the capabilities of a stack of electronic devices, such as data processing units or modules, to implement functionality, such as communication switches used for routing communications. In a stack configuration, such as the stack 20, individual electronic devices 22, 24 and 26 may be connected physically using the connection device 50 to create an operational unit, shown as the stack 20. The stack 20 may form a single virtual operational unit using resources and processing capabilities of the various components of stack 20. In one example, the individual electronic devices 22, 24, and 26 are communication switches, wherein the composite stack 20 enables communications through connection device(s) 50, such as a 32-Gbps switching stack interconnect. Configuration and routing information may be shared by electronic devices 22, 24, and 26 in the stack 20. Electronic devices may be added to the stack 20 and may be removed from the stack 20. For example, additional switches, routers and other data processing modules may be added through connection device(s) 50. While the stack 20 is illustrated with individual connection devices 50 coupling each pair of electronic devices, such as electronic devices 22 and 24, in some embodiments a connection device 50 may have additional connection points allowing a connection device 50 to couple more than two electronic devices.

In an example embodiment, the electronic devices 22, 24 and 26 are switches united by connection device 50, which may include interconnect and stacking connection devices and modules, and which creates a bidirectional closed-loop path between the electronic devices 22, 24 and 26. In the example of FIG. 1, the bidirectional path formed by a connection device 50 acts as a switch fabric for connected switches. Network topology and routing information may be updated continuously through the stack interconnect provided by the connection device 50. In some embodiments, the members of stack 20, electronic devices 22, 24 and 26, have full access to the stack interconnect bandwidth of the connection device 50, and the stack 20 may be managed as a single unit by a master switch, which is elected from one of the stack 20 member switches, such as a control 21 illustrated in FIG. 4, detailed below, as part of an example electronic device 22.

Multiple individual electronic devices and data processing units may be joined into a single logical unit according to other configurations as well, wherein the configurations employ a stack interconnect connection device, such as the connection device 50, as well as stacking software to control operation of the stacked units. The stacking software enables the stack 20 to accept new units or delete old ones without service interruption to the other stacked units. Activity within the stack 20, including addition of new units and removal of units, may be detected at any of the stack ports. Stack ports are any connection points of the electronic device. For example, a stack port provides a connection point to connect to a connection device. The stack port may be any of a variety of configurations. Further, the electronic device is able to detect electromechanical activity at a stack port, such as connection or plug in of a connection device. Once activity is detected, the stack ports are able to receive and send information about the individual components of the stack 20.

Stack management further includes balancing the load introduced by traffic to, from and within the stack 20 by allocating data packets between logical paths. An egress queue for data packets sent from the stack 20 is used to calculate path usage and partition traffic load fairly. In networked communications a data packet may be a formatted block of data carried by a packet mode computer network. A frame of data describes a data packet of fixed or variable length which has been encoded by a data link layer communications protocol for digital transmission over a node-to-node link, such as Ethernet frames and Point-to-Point Protocol (PPP) frames.

When a frame of data packets is ready for transmission onto a path, a calculation is made to determine which path has available bandwidth. The frame may then be copied onto this half of the path. Traffic may be serviced depending upon its Class of Service (CoS) or a Differentiated Services Code Point (DSCP) designation, such as in an example where low-latency traffic is given priority. When a break is detected in a connection device, the traffic may be routed or forwarded across a remaining 16-Gbps path to continue transmission or forwarding of the data.

The connection device 50 enables changes to the configuration of the stack 20, such as a change in master control, wherein the master control change may automatically reconfigure the electronic devices 22, 24 and 26. The master control then initiates gathering of information, such as switching table information, for the stack 20. The master control may further update Medium Access Control (MAC) tables as new addresses are received. Similarly, when one or more units are removed from the stack 20, the master discovers those ports, or series of ports, which were previously used for connection to the removed units. The master control may then update configuration change information while preserving pending forwarding or routing information. The master control may implement a security policy or an authentication policy, and may communicate such policy or changes in such policy to the components of the stack 20. This allows the stack 20 to change the such policy to accept new or additional types of connection devices.

The connection device 50 may be used to facilitate the configuration changes, and to implement instructions and controls from the master control, as well as to provide information to the units of the stack 20. The electronic devices 22, 24 and 26 may be physically connected sequentially, as shown in FIG. 1; however, alternate configurations may be implemented. Multiple individual connection devices 50 (e.g., see FIG. 2) may be used to interconnect various electronic devices in the stack 20.

Figure 2:
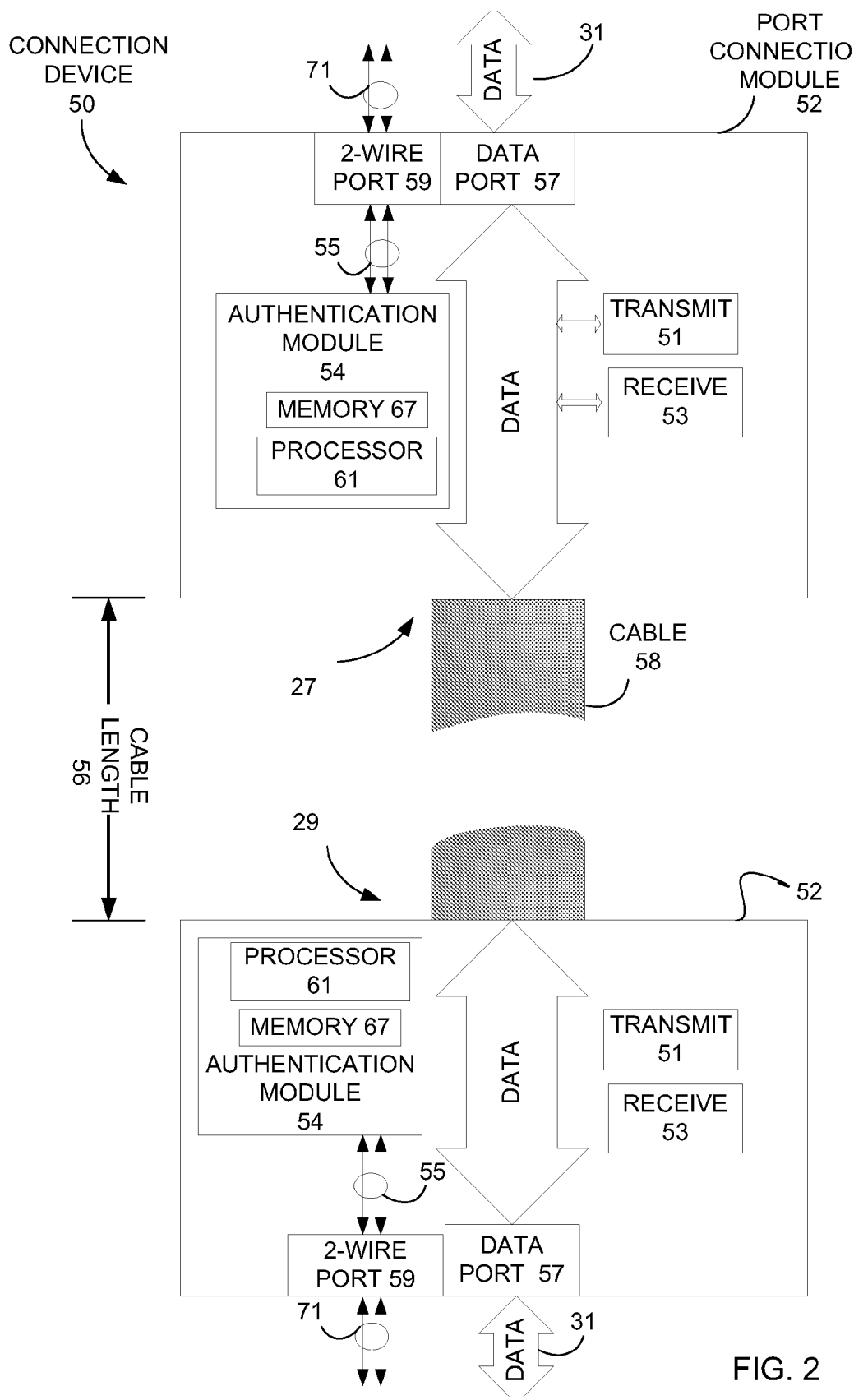
FIG. 2 is a block diagram illustrating a connection device to couple electronic devices of the stack configuration shown by way of example in FIG. 1, according to an example embodiment.

FIG. 2 illustrates an embodiment of a connection device 50 having multiple connectors, such as port connection modules 52, at opposed ends of a cable 58 (e.g., a flexible multi-core connection device), to allow communication between the electronic devices in stack 20. In some embodiments, a break in a portion of the connection device 50 results in the stack bandwidth being reduced below its full capacity. Detection mechanisms may be implemented within the electronic device 22 to detect a new connection, such as on connection of a connection device 50. Various policies may be implemented to facilitate a failover procedure, alleviate any break condition, and store dual path flow on detection of renewed connectivity and activity for the connection device 50.

In some embodiments, the connection device 50 provides authentication, security or other information to an electronic device, such as to components of the stack 20. For example, the connection device 50 may support high-speed data transmissions between the electronic device 22 and the electronic device 24. The connection device 50 may be configured to connect to a port or ports of an electronic device. In some embodiments, the connection device 50 includes a port for implementing a two-wire or other connection with an electronic device. The size, shape and dimensions of the connection device 50 may be designed to accommodate specific types of electronic devices, which may each have different connection specifications. A connection device 50, in different example embodiments, may have different types of connection mechanisms and configurations placed at each end (or connection point) of the connection device 50, to facilitate connections between different types of electronic devices. The connection 50 may include multiple connection pins to physically connect to a corresponding connector provided on a housing of the electronic devices 22, 24, and 26. A variety of connection mechanisms, configurations and connectors may be used at connection points on the electronic device and correspondingly on the connection device 50.

In the illustrated embodiment of FIG. 2, the connection device 50 includes an authentication module 54, which may be provided as an Integrated Circuit (IC), a semiconductor chip or other electronic circuitry. The authentication module 54 may be implemented as a processing unit which retrieves authentication information, or performs authentication processing to provide identification of the connection device 50 to an electronic device on connection. The authentication module 54 may include a memory storage device, such as memory 67, to store authentication information which may be transmitted to an electronic device or may be retrieved by an electronic device. The authentication module 54 may store authentication information as a digital signature. The memory 67 may be used to persistently store authentication information operatively used to authenticate the connection device 50. The authentication information may be specific to a type of the connection device 50, a manufacturer of the connection device 50, or may uniquely identify the connection device 50. Still further, the authentication module 54 may include software, firmware, circuitry or a combination thereof to implement an authentication or security policy. In some embodiments the authentication module 54 is an Application Specific IC (ASIC) designed to cooperate with the electronic device in order to authenticate the connection device 50.

Some embodiments may implement mechanisms to achieve various goals and to respond to operating considerations in a data processing environment, such as designs to avoid cross talk with data traffic. In some embodiments, communication with the connection device 50 includes an authentication procedure, or a security procedure, to authenticate or verify the connection device 50. The authentication procedure may be performed while data traffic is idle, in other words, when the electronic device is not currently transmitting data. The authentication module 54 may receive power from the connected electronic device. After authentication of the connection device 50, the electronic device (e.g., the electronic devices 22, 24, and 26) may disable power to the authentication module of the connection device 50, as the connection device 50 may not require further power in order to operate. After authentication, the connection device 50 facilitates communication among components of the stack 20 along the cable 58, such as in conventional high speed data transmissions.

Continuing with FIG. 2, the connection device 50 is shown to include multiple port connection modules 52 at opposed ends of a cable 58. The cable 58 is illustrated as having a first end 27 and a second opposing end 29. A port connection module 52 is provided at each end of the cable 58. Within each port connection module 52 is an authentication module 54 which is coupled to a two-wire port 59 via connectors 55. The two-wire port 59 is configured for connection to a similar connection port, e.g., two-wire port, of an electronic device. Further, each port connection module 52 includes a data port 57 (see FIG. 2) in each of the cable 58. The transmit unit 51 and the receive unit 53 are included within the port connection module 52. Some embodiments present these units and/or modules at different locations within the connection device 50.

The cable 58 may be a flexible interconnect apparatus for transmission of electrical signals. In one example, the cable 58 is an elongate flexible cable including a plurality of conductive cores. In some embodiments, the cable 58 may include wires, optical fibers, conductors and so forth. The cable 58 may be a coaxial cable or other configuration; the cable 58 may support video, audio, analog and digital transmissions as well as other types of transport media, and may support any of a variety of transmission and communication specifications and protocols.

The cable 58 may include multiple conductors running through the length 56 of the cable 58. As illustrated, the cable 58 may be of any length 56. In an example embodiment, the cable 58 is provided in various standard lengths available for stack interconnects. It is to be appreciated that the cable 58 may be a conventional wired cable device or other communication device, including an optical or other connection device. Similarly, the cable 58 may be any convenient length 56. In some embodiments, the cable 58 provides a data path for high-speed data connections according to a communication protocol.

Further, while the connection device 50 in FIG. 2 is illustrated as having a first end 27 and a second end 29, other embodiments of a cable 58 may have different configurations, including additional cable portions and connection points. For example, cable 58 may connect more than two electronic devices.

Additionally, it is to be appreciated that, in other embodiments, a multiple port connection module 52 may be provided at one end of the connection device 50 and a different connection device or module may be provided at the other end of the cable 58. In an example embodiment, each of the port connection modules 52 couples to a data processing module, such as the electronic devices 22, 24 and 26. The port connection modules 52 may have any of a variety of connection configurations to connect with the connectors of the electronic devices 22.

In an example embodiment, the connection device 50 further includes a transmit unit 51 and a receive unit 53, which enable communication to and from the connection device 50, and facilitate transmission and receipt of data packets and information. The connection device 50 is shown, by way of example, to include an authentication module 54 to enable authentication of the connection device 50 in the stack 20. Authentication may include processes to identify a characteristic of the connection device 50, such as type or manufacturer, and may include processes to maintain security of the stack 20. For example, when one of the electronic devices 22, 24 and 26 is first added to the stack 20, the connection device 50 is used to connect the module to the stack 20. At this time, the connection device 50 is authenticated against known or agreed criteria. In one embodiment, when the connection device 50 is physically connected to an electronic device, an indication of the connection is received by a master unit in the stack 20, which may be one of the electronic devices 22, 24, and 26 or may be another module (not shown). In some embodiments, an indication of the connection may be received by multiple units or modules of the stack 20.

As in the embodiment illustrated in FIG. 2, the connection device 50 includes multiple authentication modules 54, each to be coupled to an electronic device, such as by using a two-wire connection 55. The connection device 50 may include an authentication module 54 at each end of the cable 58 (e.g., first and second ends, 27, 29). In this way for example, each port connection module 52, or connection point of the connection device 50, has an authentication mechanism to authenticate connection of the connection device 50 to an electronic device.

The authentication modules 54 may each store a digital signature or other identifier (unique or otherwise) used to identify and/or authenticate the connection device 50. The identifier may be programmed during production and assembly of the connection device 50, or may be added later. The two-wire connection 55 is shown by way of example to couple the authentication module 54 to the two-wire port 59. The two-wire port 59 then couples to an electronic device by way of two-wire connection 71, as a high-speed data channel may not be needed for implementation of the authentication or security mechanisms. Alternate embodiments may implement other connection mechanisms so as to enable communication between the authentication module 54, or other processing module, and an electronic device.

In an example embodiment, the two-wire connection 55 provides a communication mechanism for supplying a clock signal to the authentication module 54. The two-wire connection 55 further provides a mechanism for receiving the authentication information from authentication module 54. When the connection device 50 is initially connected to the electronic device 22, for example, the electronic device 22 provides power to the authentication module 54. The power may enable various components of the port connection module 52 for communication with the electronic device 22. For example, the authentication module 54 may be powered to allow the authentication module 54 to transmit an identifier for authentication to the electronic device 22 (see FIG. 3). Thus, in an example, embodiment, power to circuitry provided within the connection device 50 may be provided from a connected electronic device or otherwise from stack 20, such that the connection device 50 may require no internal power source.

In some embodiments the authentication information identifies a manufacturer of the connection device. The authentication information may be a hash of information, a software license, a digital signature, an encrypted value, and so forth. In an example embodiment of a stack configuration 20, the authentication information may be selectively used by a switch to enable and control stacking functionality of multiple electronic devices.

Each authentication module 54 works to authenticate the connection device 50. Each authentication module 54 is shown in close physical proximity to a connection point of the connection device 50. For example, the port connection modules 52 are each positioned close to the first and second ends, 27 and 29, in order to provide authentication information on connection to the electronic devices 22 and 24. In some embodiments the authentication information is stored in the connection device 50 at the time of manufacture. In some embodiments, the information may be changed when power is supplied to the authentication module 54, such as at the time of connection. In one embodiment, the authentication module 54 includes a memory storage unit, such as memory 67 illustrated in FIG. 2, to store the authentication information. The memory 67 may be updated, and the authentication information changed, using a secure access scheme. In such an embodiment, the authentication module 54 retrieves the authentication information from the memory 67 to provide the authentication information on connection to an electronic device 22 of the stack 20. In some embodiments, the connection device 50 may provide the authentication information in response to a request from the electronic device 22.

In some embodiments the authentication information may be stored in a common memory storage device (not shown) which may be accessed by both authentication modules 54. In some embodiments, the authentication information may by dynamically changed to implement any of a variety of authentication or security procedures. The authentication or security policy may involve additional information used that may be used to provide security checks. In the connection device 50 each port connection module 52 may have an authentication module 54 to facilitate security and authentication of each connection. It is however to be appreciated that the various components of the connection device 50 need not necessarily be provided at opposed end of the cable 58, but may be provided at any point along a cable length 56.

Although in the illustrated example of FIG. 2 the circuitry shown located within the port connection module 52, the individual components, including and not limited to the authentication module 54, may be located within the cable 58, within the port connection module 52, or on an external module which attaches to the connection device 50. In some embodiments, the two-wire port 59 and the data port 57 are combined into a single housing or functional unit (not shown), in other embodiments, the two-wire port 59 and the data port 57 are position in separate housings (not shown) and provided, for example, as separate connectors. The use of a two-wire connection is provided for clarity of understanding and is one example of such connectors. It is to be appreciated that the connection between the connection device 50 and a corresponding electrical device may include a single composite connector or two or more separate connectors. Some embodiments implement a connection to the authentication module 54 using other types of connectors. Additionally, as illustrated, the cable 58 has a length 56, by which the connection device 50 may be specified or identified. While connection device 50 is illustrated having port connection modules 52 positioned at connection points of the cable 58, it is appreciated that other types of connection mechanisms may be implemented.

Figure 3:
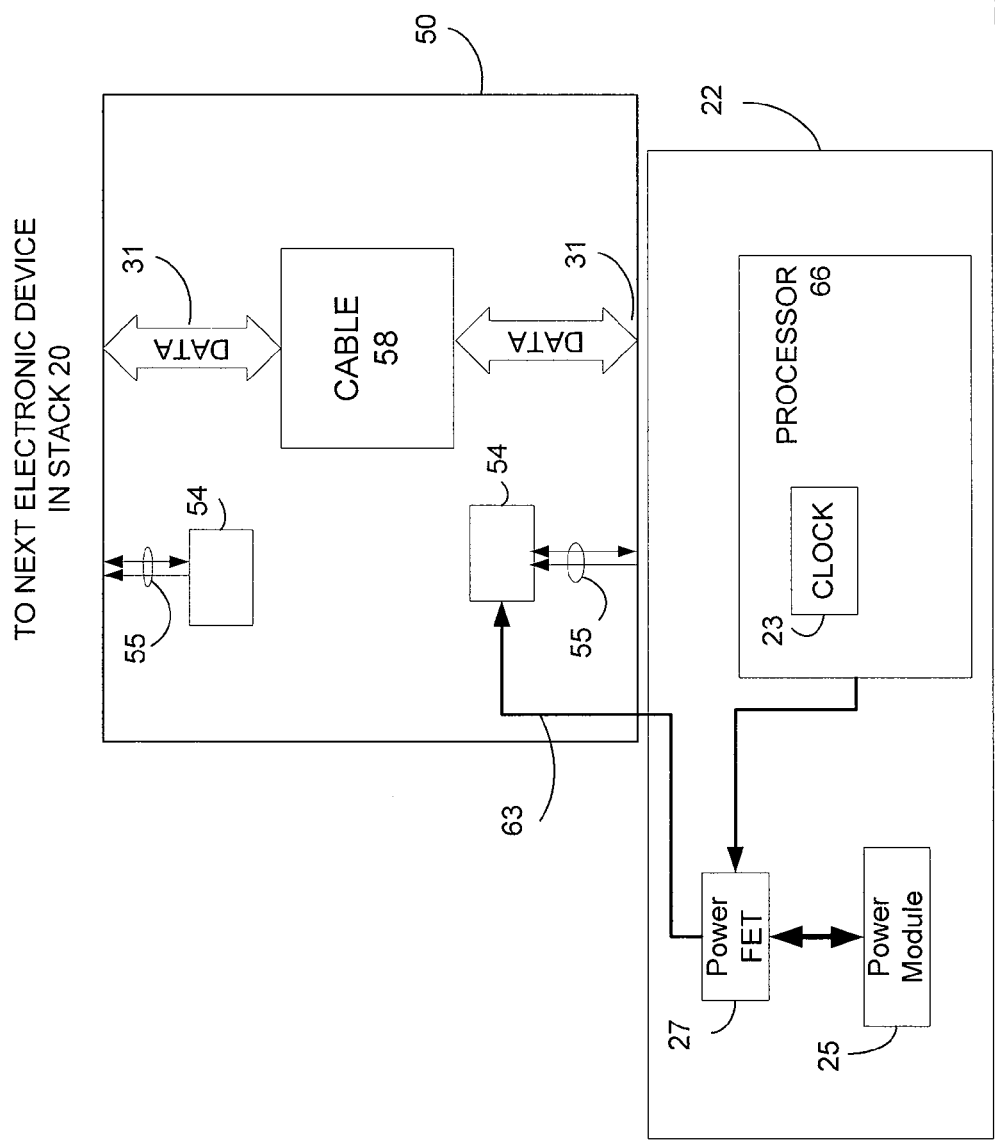
FIG. 3 is a block diagram illustrating a coupling of an electronic device using the connection device of FIG. 2, according to an example embodiment.

FIG. 3 is a block diagram of a coupling of an electronic device 22 to the connection device 50, according to an example embodiment. The electronic device 22 includes a processor 66, a power module 25 and a power circuit, such as power Field-Effect Transistor (FET) 27. The power module 25 enables communication with the authentication module 54 of the connection device 50 on each new connection. The power module 25 transitions the authentication module 54 to a dormant mode, or other low power mode, when the connection is complete or when a connection is denied. Thus, various components of the connection device 50 may be powered down, or at least partially powered down, after authentication of the connection device 50. The power module 25 may be implemented in a hardware configuration, such as an ASIC, or in software, firmware or a combination thereof. The power module 25 controls the power FET 27, which provides power to the authentication module 54 on connection. The power FET 27 connects to the authentication module 54 by connector(s) 63, which may be plugged into a port or other input mechanism of the connection device 50. The power module 25 instructs the power FET 27 to supply power to the authentication module 54 on occurrence of events, such as when a connection to the connection device 50 is detected.

The processor 66 controls the transmission and receipt of data, such as on the high speed data bus 31, and controls operation of the power module 25. The processor 66 also includes a clock 23 which generates a clock signal. In one embodiment, a two-wire connection 55 provides a clock signal from the clock 23 to the authentication module 54, wherein the clock signal is used to control transmission of data, such as authentication information. The clock 23 provides a clock signal to the authentication module 54 as a clocking mechanism for transmission of the authentication information to electronic device 22. The processor 66 provides the control for receiving the authentication information by supplying power to the authentication module 54, which enables transmission of the data from the authentication module 54.

In one example, the connection device 50 is used to couple one electronic device 22 to a next electronic device 24, with connection as shown through another high speed data bus 31. As illustrated by way of example, the connection device 50 further includes a second authentication module 54 for authenticating the connection device 50 for connection on the other end of cable 58.

Figure 4:
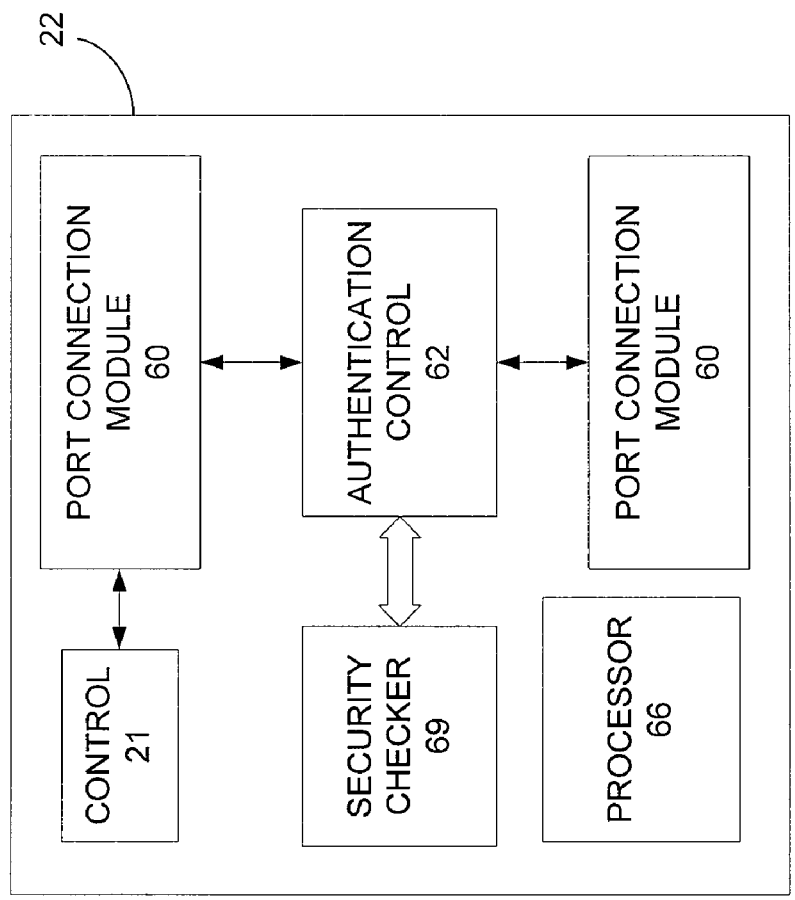
FIG. 4 is a block diagram illustrating details of an electronic device as in FIG. 3, according to an example embodiment.

FIG. 4 is a block diagram illustrating example details of the electronic device 22, according to an example embodiment. The electronic device 22 includes the processor 66, which implements functionality of the electronic device 22, such as to act as a switch, router, server, and so forth. Each port connection module 60 acts as a complement to a port connection module 52 of connection device 50 (illustrated in FIG. 2). The electronic device 22 may include any number of connection points, and thus any number of port connection modules 60. It is appreciated that the electronic device 22 may include a variety of connection points, some of which may not require authentication of a connection device. The electronic device 22 further includes authentication control 62, which provides activities to authenticate the connection device 50 when connection is detected, and may optionally include a security checker 69 to implement a security policy for the stack 20. The security policy may implement any of a variety of techniques for identifying the connection device 50 and authenticating connection of the connection device 50 within the stack 20. The security checker 69 may implement an authentication policy as well. Authentication of the connection device 50 prior to use within stack 20 may hinder the introduction of sub-standard connection devices which may compromise the function and operation of the individual units of stack 20. In one embodiment, the security checker 69 compares the authentication information received from authentication module 54 to a range of values. In another embodiment, security checker 69 evaluates the authentication information, such as to implement a hashing function on the authentication information, or otherwise process the authentication information to derive a value for comparison to a security value. The authentication control 62 controls the authentication process and may include software or instructions provided as computer-readable code which causes the processor 66 and security checker 69 to perform authentication of the connection device 50. In still another embodiment, authentication may be implemented using a cryptographic or other encryption technique.

Figure 5:
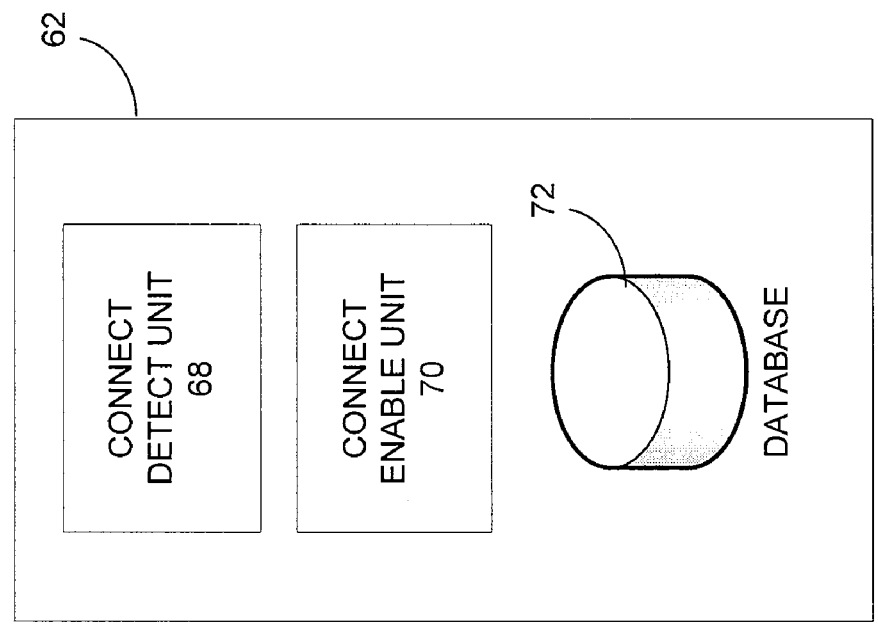
FIG. 5 is a block diagram illustrating an authentication control unit in an electronic device as in FIG. 4, according to an example embodiment.

FIG. 5 is a block diagram illustrating an authentication control unit 62 in the electronic device 22, according to an example embodiment. A connect detect unit 68 identifies when the connection device 50 is connected or disconnected from the electronic device 20. Further, the authentication control 62 includes a connect enable unit 70 to communicate with the security module 64 on detection of a connection or a disconnection of the connection device 50. The connect enable unit 70 provides information to the authentication module 54 for evaluation of the new connection device under the security policy. When the connection device 50 is authenticated, the connect enable unit 70 enables the connection of electronic device 22 with the new connection device 50, and may instruct the authentication module 54 to enter a dormant mode to at least reduce power consumption. In an example embodiment, the authentication control 62 includes a database 72 (or any other persistent storage) that stores connection device identification information, and which may include a historical listing of connection attempts, successes and failures. In some embodiments, the authentication control 62 and/or security checker 69 may have a low power mode while authentication processing is not active.

Figure 6:
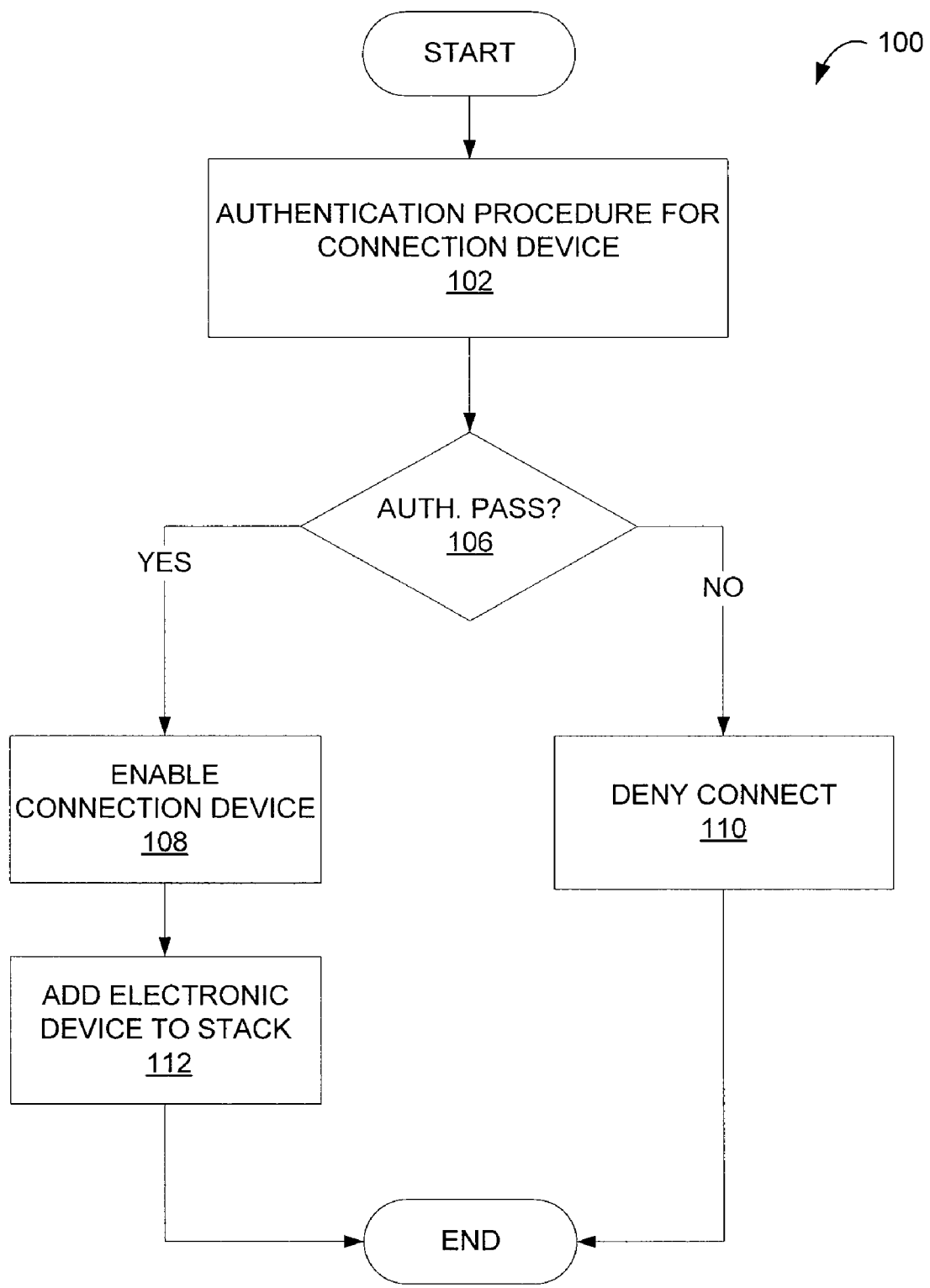
FIGS. 6 and 7 are flow diagrams illustrating authentication of a connection device, according to example embodiments.

FIG. 6 is a flow diagram illustrating a method 100 of authenticating a connection device. The method 100 may be used in conjunction with the connection device 50 and, accordingly, is described by way of example with reference thereto. The method 100 includes operations to implement an authentication procedure, at operation 102, for connection to the connection device 50. The authentication procedure may initiate when the connection device 50 is connected to the electronic device 22. On detecting a connection to the connection device 50, the electronic device 22 initiates an authentication procedure to identify the connection device 50 and confirm the connection device 50 supports and satisfies an authentication policy. The authentication policy, as well as a security policy, may assist in protecting the Quality of Service (QoS) requirements of the stack 20, as well as avoiding costly problems associated with faulty connection devices. In some embodiments a single policy addresses both authentication and security concerns.

At decisional operation 106, when the authentication control 62 determines the connection device 50 passes authentication processing, the connect enable unit 70 enables, at operation 108, connection device 50 for connection to the electronic device 22. The connection device 50 is then used to enable, at operation 112, addition of the electronic device 22 to the stack 20. Returning to decisional operation 106, when the authentication does not pass, such as when the authentication information or a security code does not match, the connection device 50 fails authentication and a connection to the stack 20 is denied (see operation 110).

Figure 7:
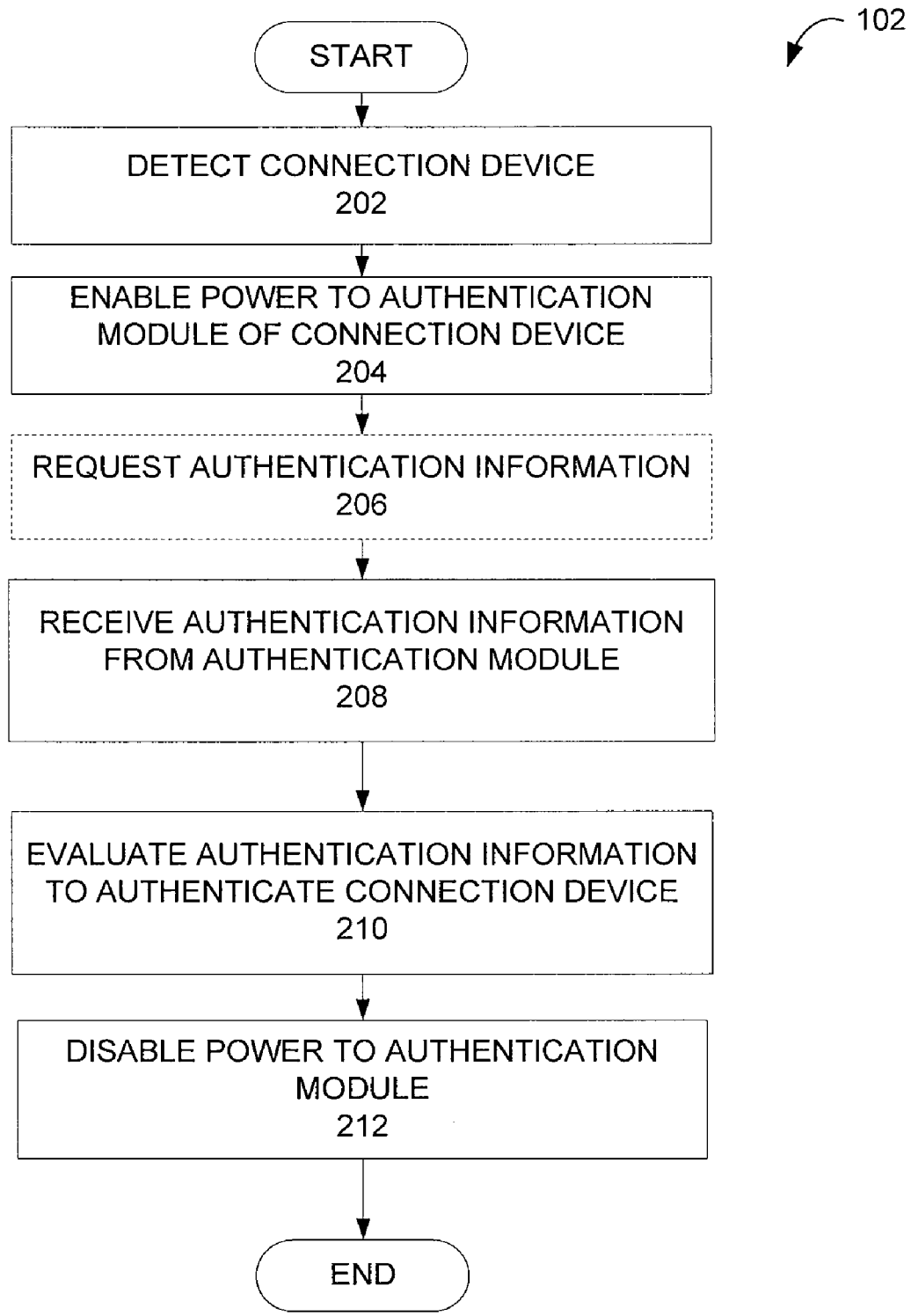

Referring to FIG. 7, the method 102 (see FIG. 6) is further detailed in accordance with an example embodiment. The method 102 starts on detection, at operation 202, of a connection device. The method 102 may be performed using a connection device 50 and, accordingly, is described by way of example with reference thereto. On detecting a connection of the connection device 50 to the electronic device 22 of the stack 20, the connection device 50 assists in the configuration setup of the stack 20. As shown at operation 204, the electronic device 22 provides power to the authentication module 54 of the connection device 50. The electronic device 22 may optionally send a request for authentication information to the connection device 50 (see operation 206). The connection device 50 may then respond by providing the requested information.

On power being supplied to the connection device 50, the authentication module 54 is then enabled to send authentication information, such as a digital signature, to the electronic device 22 (see operation 208). In some embodiments, the authentication information may be a simple code, or may be detailed information. Some embodiments involve negotiation between the connection device 50 and the electronic device 22, such as a handshake process, which may include sharing of information, including configuration information. The communication of information in such an embodiment is illustrated by way of example in FIG. 9, described hereinbelow.

As shown at operation 208, the electronic device 22 receives the authentication information or digital signature and evaluates the authentication information to authenticate the connection device 50 (see operation 210). The method 102 includes disabling or at least reducing the power supplied to the authentication module 54 (see operation 212). Some embodiments disable power immediately on receipt of the authentication information. Other embodiments evaluate the information and make operational decisions based on this evaluation, prior to disabling power.

Figure 8:
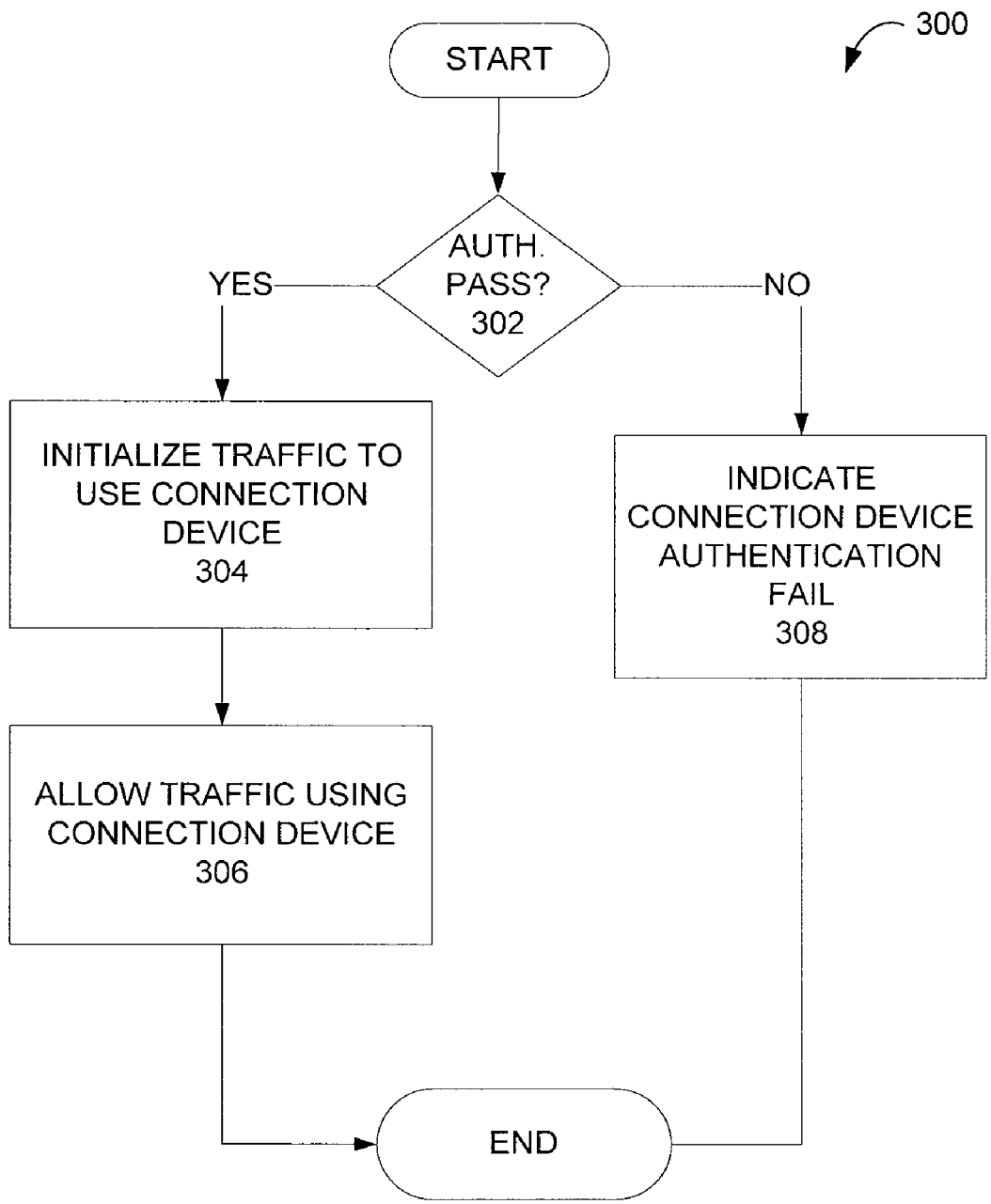
FIG. 8 is a flow diagram illustrating a method for authentication of a connection device, according to an example embodiment.

FIG. 8 further details an embodiment for authenticating a connection device (e.g. connection device 50) and configuring a stack (e.g. stack 20). The method 300 works in coordination with the method 100 of FIG. 7. As shown in decisional operation 302 of method 300, when the connection device 50 is authenticated, the connection device 50 is thus authenticated for transmission of data or traffic. The method 300 includes operations to initialize traffic, at operation 304, to use the connection device 50, and to allow traffic using the connection device 50 (see operation 306). When the connection device does not pass authentication, at decision point 302, connection device failure is indicated, at operation 308, such as to send a message to a master controller of the stack 20, or to store a value in the electronic device 22 to identify the connection device failure. A fail indicator may be reported to the electronic device 22 (and/or any other device). In an example embodiment, a connection device authentication fail report may be an indicator light on the electronic device 22, displayed information on a terminal or display screen associated with the electronic device 22, or may be a report that is provided to a database and available to users, system administrators, or the like.

Figure 9:
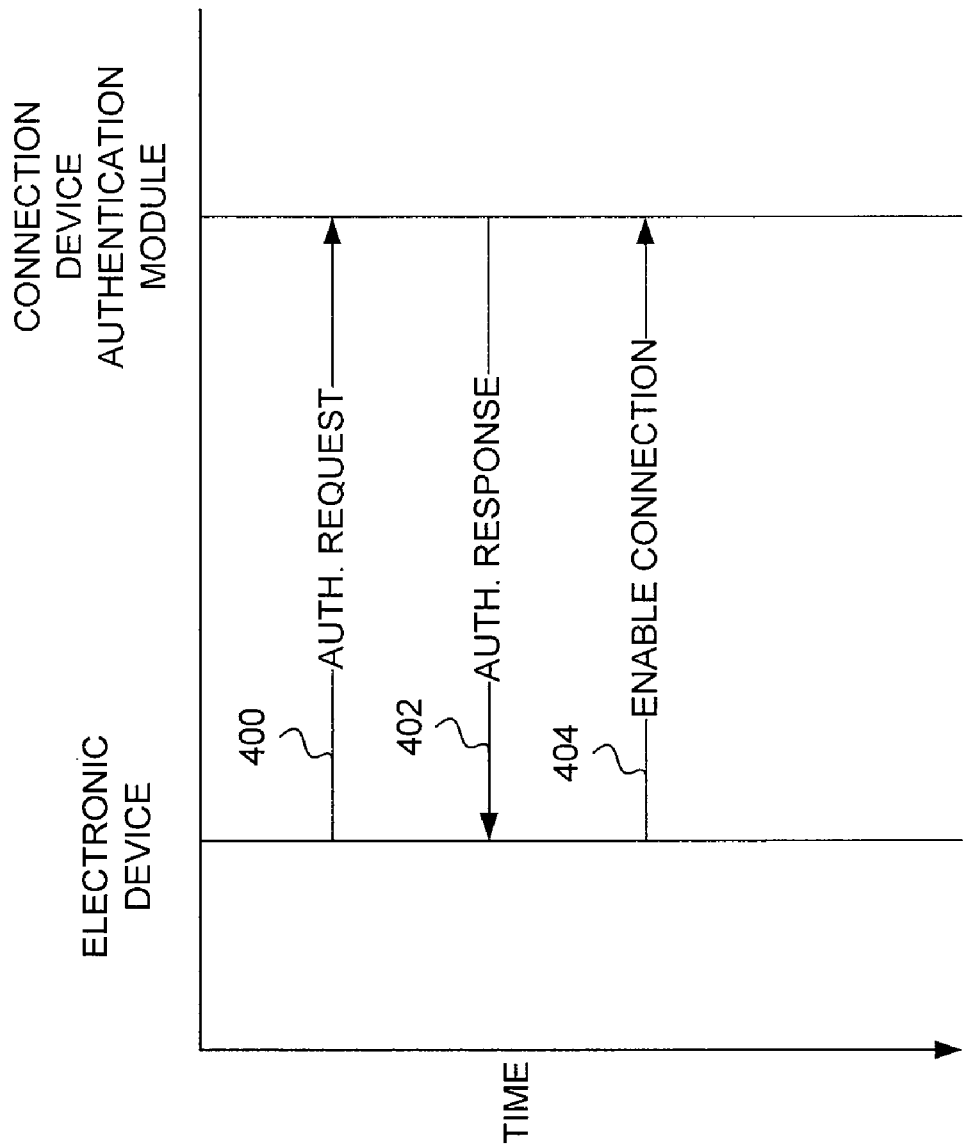
FIG. 9 is a signal interaction diagram illustrating communication between a connection device and an electronic device, according to an example embodiment.

FIG. 9 is a signal flow diagram illustrating communication between a connection device (e.g., the connection device 50) and a data processing device (e.g., an electronic device 22), according to an example embodiment. A time reference is provided on the vertical axis. The electronic device 22 sends an authentication request 400 to the authentication module 54 of the connection device 50. In response, the authentication module 54 sends the requested information as an authentication response 402, including authentication information. The authentication information is then received at the electronic device 22, where the authentication processing authenticates the connection device 50. On authentication confirmation, the electronic device 22, in some embodiments, sends an enable connection message 404 to the security module of the connection device 50. Communication may then be enabled, and the connection device 50 may used to add the electronic device 22 to the stack 20.

In one example embodiment, a timer (not shown) is initiated on transmission of the authentication request (see operation 300). If the connection device 50 does not have a security module, no authentication response will be sent, the timer will expire, and the connection device will fail authentication.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "Software as a Service" (SaaS). For example, at least some of the operations may be performed by a group of computers (as examples of machines including processors), with these operations being accessible via a network (e.g., the Internet) and via one or more appropriate interfaces (e.g., Application Program Interfaces (APIs).)

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A connection device, comprising:
 a cable having first and second opposed ends;
 a first connector provided at the first end of the cable;
 a second connector provided at the second end, the cable to provide communication of data between the first and the second connectors; and
 at least one authentication module, the at least one authentication module configured to facilitate authentication of the connection device when connected to an electronic device, the authentication of the connection device includes identification of the connection device as passing the authentication, the connection device being initialized to enable data transmissions responsive to the identification of the connection device as passing the authentication of the connection device, the at least one authentication module comprising:
 a processor; and
 a memory storage unit, the processor and the memory storage unit are powered by the electronic device upon connection of the connection device to the electronic device, the at least one authentication module to transition to a dormant state that does not consume power,
 the connection device to receive a data transmission from the electronic device notwithstanding the transition of the at least one authentication module to the dormant state.

2. The connection device of claim 1, wherein the at least authentication module comprises memory to persistently store authentication information operatively used to authenticate the connection device.

3. The connection device of claim 2, wherein the authentication information identifies a manufacturer of the connection device.

4. The connection device of claim 2, wherein the authentication information is a digital signature or hash.

5. The connection device of claim 2, wherein the authentication information corresponds to a software license.

6. The connection device of claim 1, wherein the cable is an elongate flexible cable including a plurality of conductive cores.

7. The connection device of claim 1, wherein the at least one authentication module comprises a first authentication module provided proximate the first connector to couple to a first electronic device, and a second authentication module provided proximate the second connector to couple to a second electronic device,
wherein the connection device is to communicatively couple the first electronic device to the second electronic device.

8. The connection device of claim 7, wherein the first and second electronic devices are data processing modules, the connection device to couple the data processing modules in a data stack.

9. The connection device of claim 1, wherein the electronic device is a switch and the at least one authentication module includes authentication information used by the switch to selectively enable stacking functionality.

10. The connection device of claim 1, wherein the at least one authentication module is configured to detect a disconnection event when the connection device is disconnected from the electronic device and require new authentication of the connection device when reconnected to the electronic device.

11. The connection device of claim 1, wherein the cable comprises a plurality of flexible elongate cables to interconnect the first and the second connectors.

12. The connection device of claim 1, wherein the at least one authentication module is positioned within the cable.

13. A method for authenticating a connection device, the method comprising:
detecting connection of the connection device to an electronic device;
providing power to the authentication circuitry in the connection device;
receiving authentication information from authentication circuitry in the connection device;
authenticating the connection device based on the authentication information, the authenticating the connection device including identifying the connection device as passing the authenticating;
initializing the connection device to enable data transmissions responsive to the identifying the connection device as passing the authenticating; and
disabling power to the authentication circuitry in the connection device, the connection device being initialized to enable data transmissions responsive to the identifying the connection device as passing the authenticating notwithstanding the disabling the power to the authentication circuitry in the connection device.

14. The method of claim 13, wherein authenticating the connection device comprises evaluating a software license.

15. The method of claim 13, wherein the authenticating the connection device comprises evaluating a digital signature.

16. The method of claim 13, wherein the connection device includes at least one data port to facilitate the data transmissions and authentication circuitry that operates independent of the data port.

17. A method for authenticating a connection device, the connection device connectable to at least one electronic device, the method comprising:
storing authentication information in a first authentication module of the connection device, the first authentication module proximate a first end of the connection device;
receiving power from a first electronic device connected to the first end of the connection device, the power enabling the first authentication module;
transmitting the authentication information from the first authentication module of the connection device to the first electronic device, the authentication information to facilitate an authentication of the connection device;
receiving an enablement for connection of the connection device to the first electronic device;
transitioning of the first authentication module to a dormant state that does not consume power after authentication of the connection device; and
receiving data transmission from the first electronic device notwithstanding the transitioning of the first authentication module to the dormant state.

18. The method of claim 17, further comprising:
storing the authentication information in a second authentication module of the connection device, the second authentication module proximate a second end of the connection device;
receiving power from a second electronic device connected to the second end of the connection device, the power enabling the second authentication module;
transmitting the authentication information from the second authentication module of the connection device to the second electronic device; and
transmitting data traffic between the first electronic device and the second electronic device through the connection device.

19. The method of claim 17, wherein transmitting the authentication information comprises receiving a clock signal from the first electronic device to clock transmission of the authentication information from the first authentication module to the first electronic device.

20. The method of claim 17, further comprising:
receiving a request for authentication information from the first electronic device.

* * * * *